US005907620A

United States Patent [19]
Klemba et al.

[11] Patent Number: 5,907,620
[45] Date of Patent: May 25, 1999

[54] METHOD AND APPARATUS FOR ENFORCING THE USE OF CRYPTOGRAPHY IN AN INTERNATIONAL CRYPTOGRAPHY FRAMEWORK

[75] Inventors: Keith Klemba; Roger Merkling, both of Palo Alto; Helmut Fieres, Mountain View, all of Calif.

[73] Assignee: Cheyenne Property Trust, San Francisco, Calif.

[21] Appl. No.: 08/702,304

[22] Filed: Aug. 23, 1996

[51] Int. Cl.⁶ .................................................... H04L 9/00
[52] U.S. Cl. ........................... 380/25; 380/9; 380/23; 380/49; 380/59
[58] Field of Search ................... 380/1, 2, 3, 9, 380/23, 25, 49, 50, 59, 10, 16, 20

[56] References Cited

U.S. PATENT DOCUMENTS

| | | | |
|---|---|---|---|
| 5,164,988 | 11/1992 | Matyas et al. | 380/25 |
| 5,651,068 | 7/1997 | Klemba et al. | 380/25 |

Primary Examiner—Bernarr E. Gregory

[57] ABSTRACT

A cryptographic framework consists of four basic service elements that include a national flag card, a cryptographic unit, a host system, and a network security server. Three of the four service elements have a fundamentally hierarchical relationship. The National Flag Card (NFC) is installed into the Cryptographic Unit (CU) which, in turn, is installed into a Host System (HS). Cryptographic functions on the Host System cannot be executed without a Cryptographic Unit, which itself requires the presence of a valid National Flag Card before it's services are available. The fourth service element, a Network Security Server (NSS), can provide a range of different security services including verification of the other three service elements. Several different configurations that support policy within a cryptographic system allow the framework to be adapted to various connection schemes involving, at least, the cryptographic unit and the policy, including dedicated applications, e.g. a policy provided in a cryptographic unit having either a built-in or local smart card reader, or a policy in a remote smart card reader; and shared applications, e.g. a policy provided in a host system local smart card reader.

36 Claims, 10 Drawing Sheets

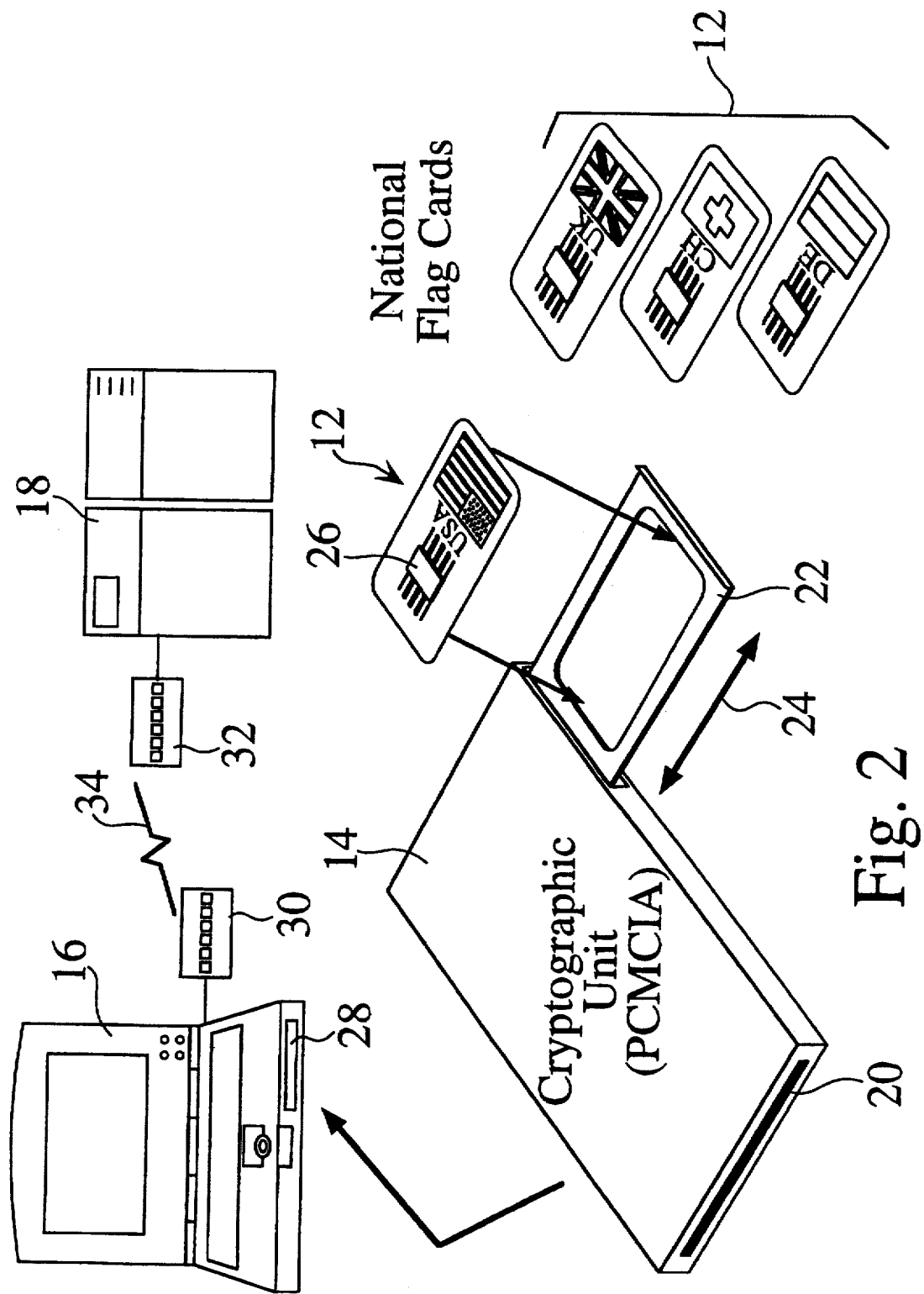

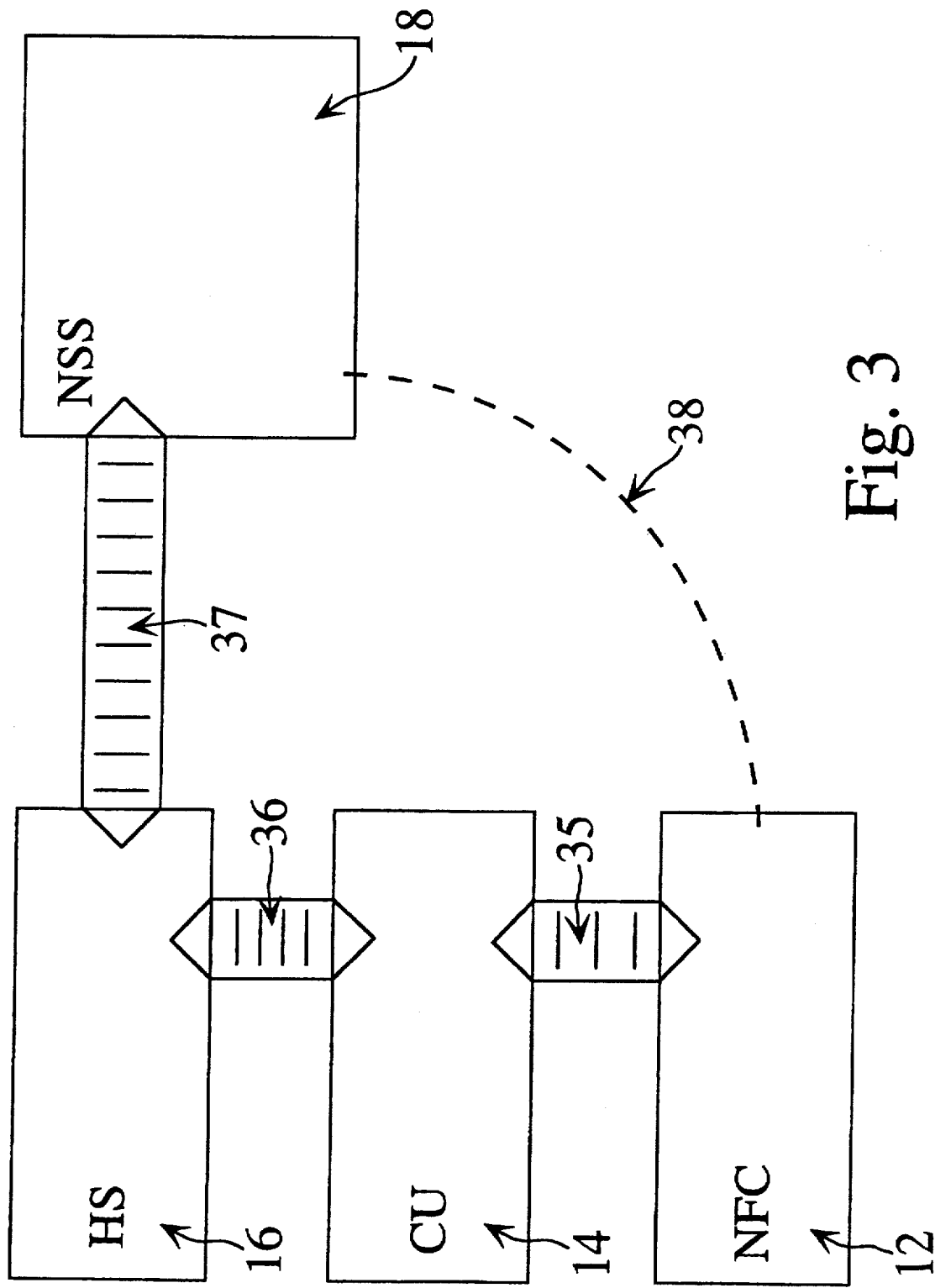

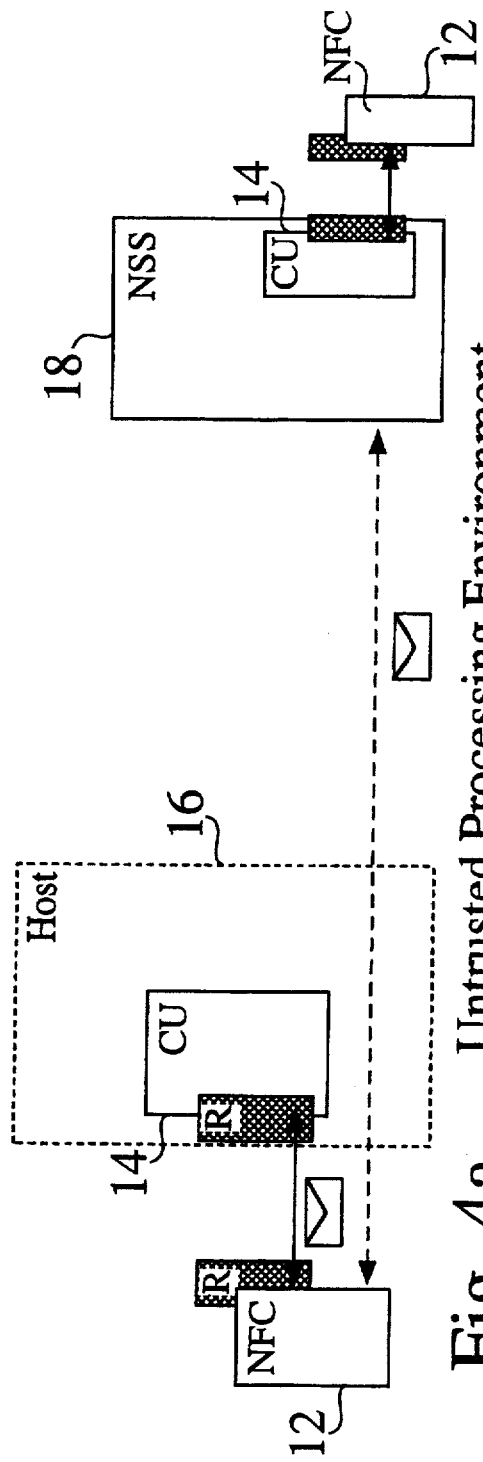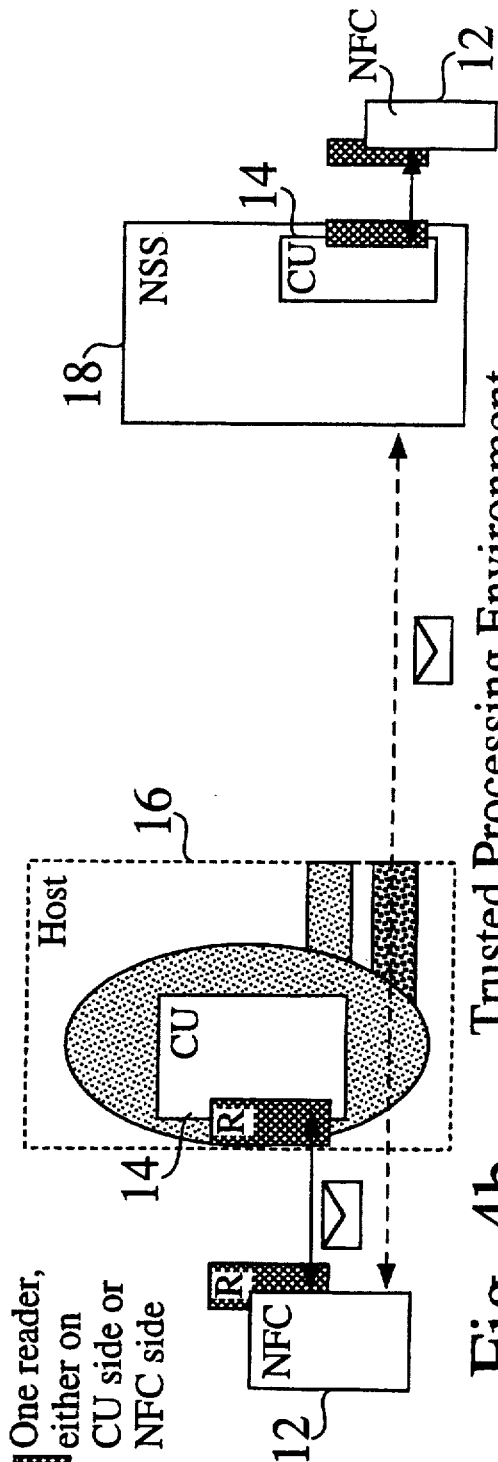

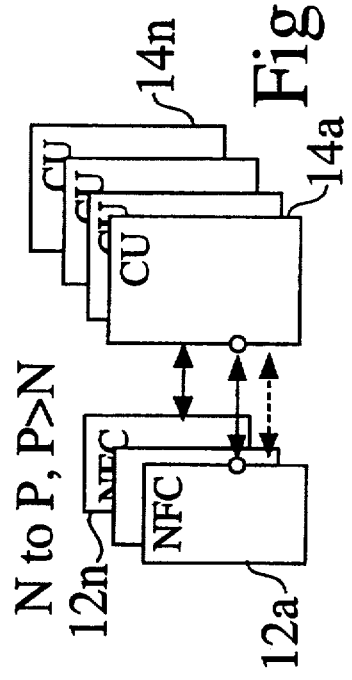
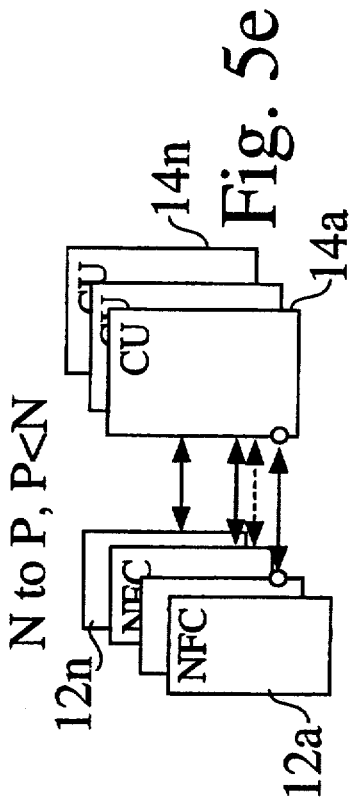
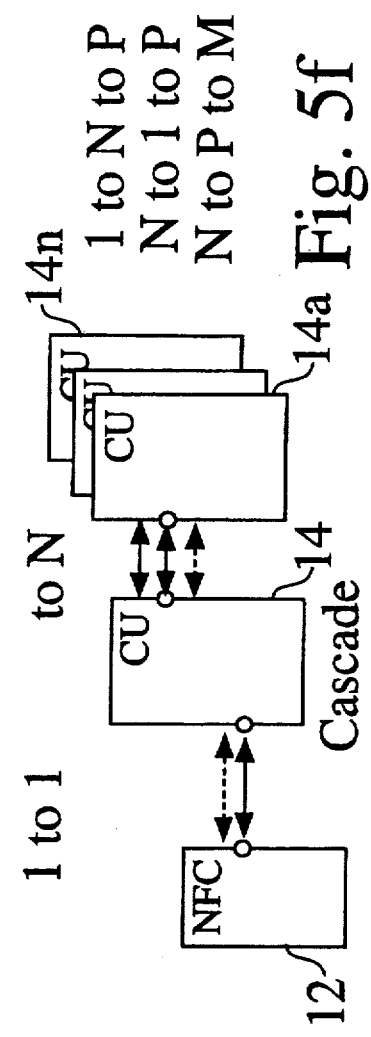
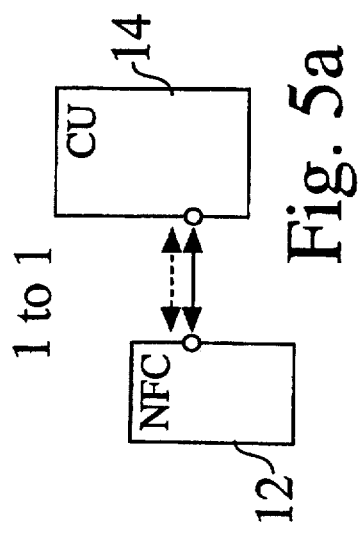
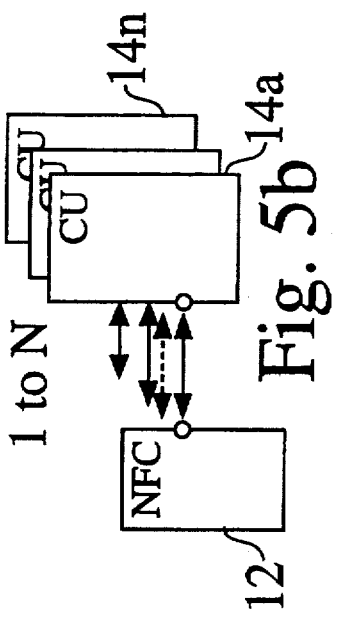
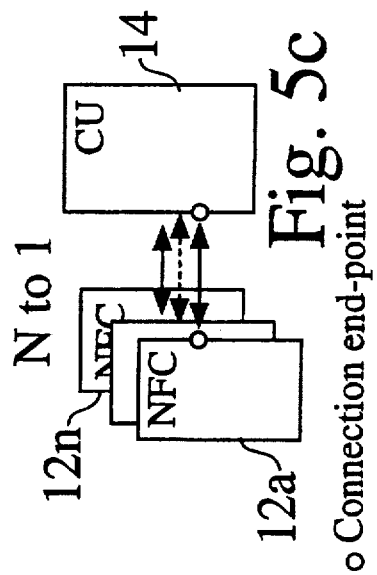

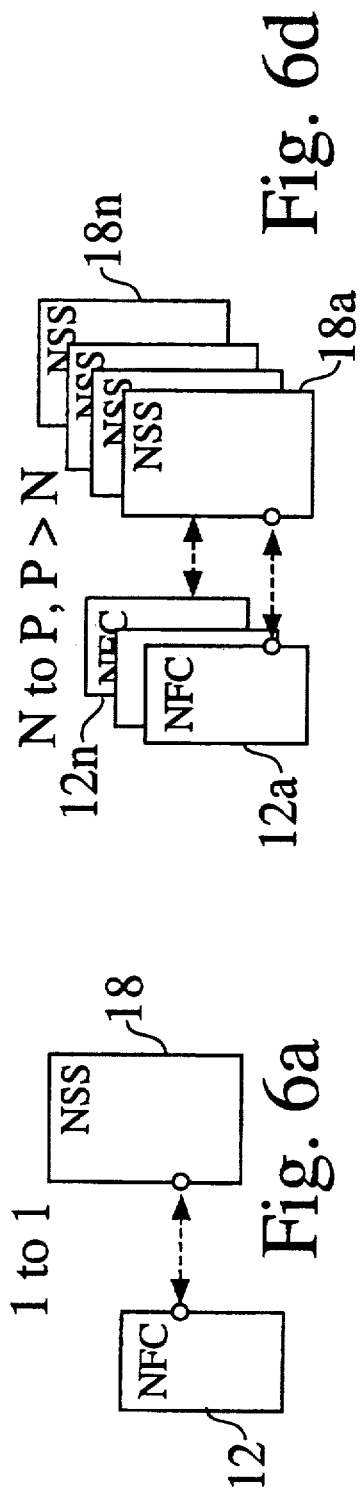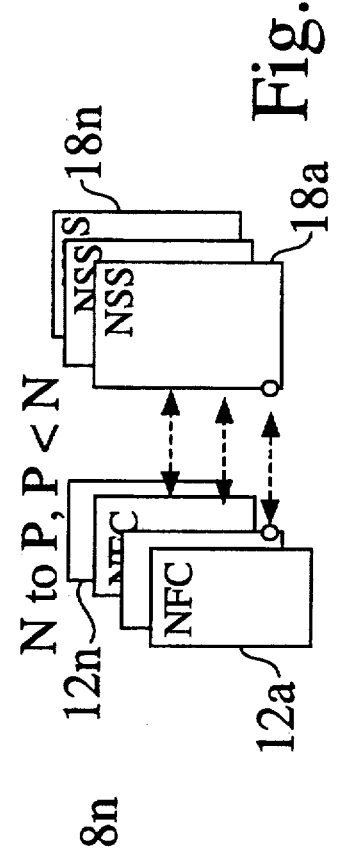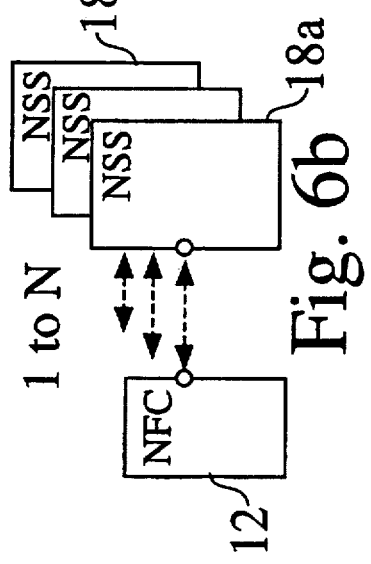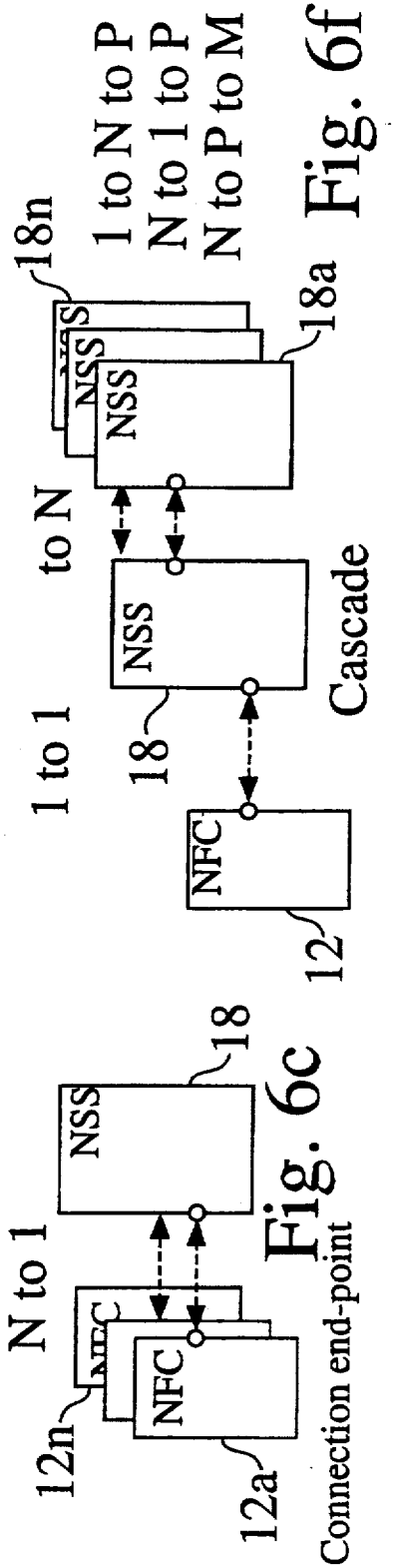

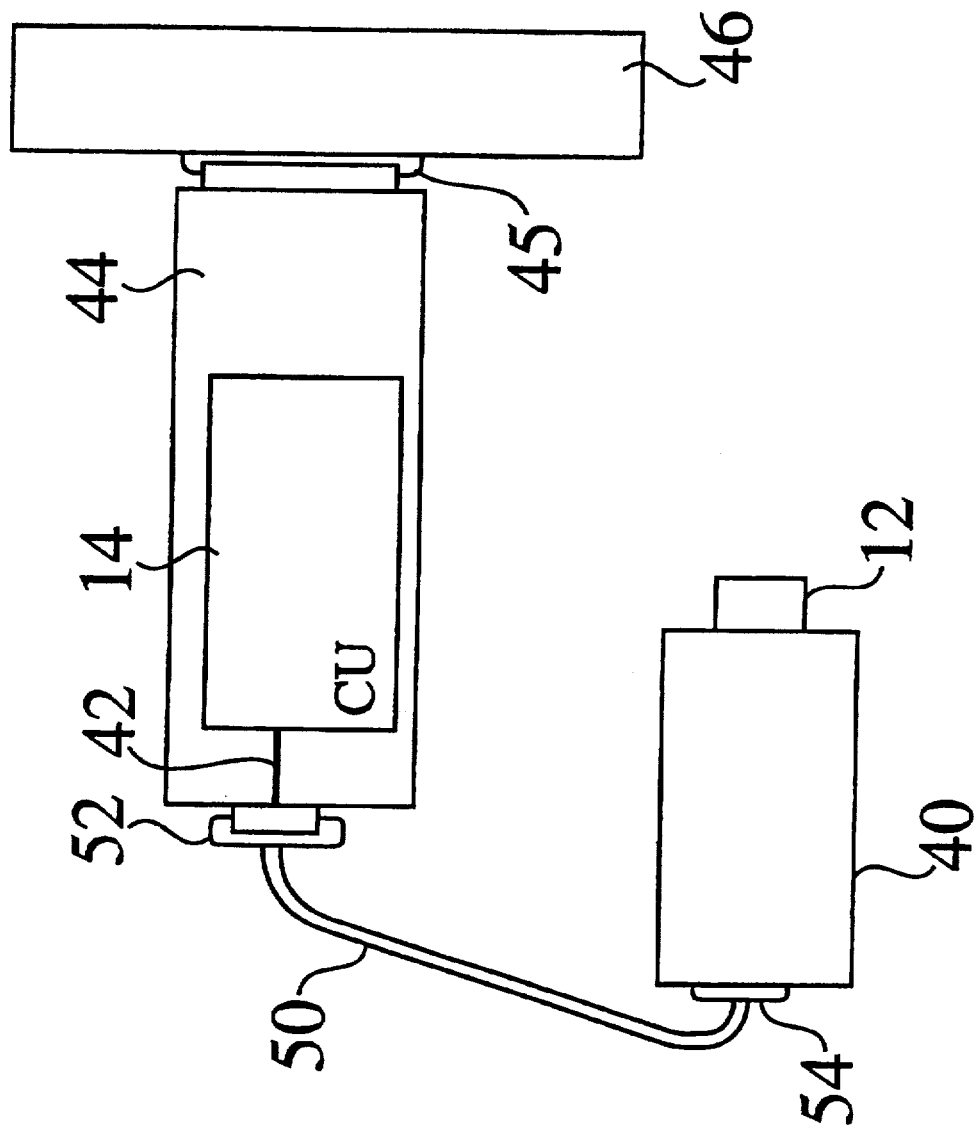

METHOD AND APPARATUS FOR ENFORCING THE USE OF CRYPTOGRAPHY IN AN INTERNATIONAL CRYPTOGRAPHY FRAMEWORK

BACKGROUND OF THE INVENTION

1. Technical Field

The invention relates to cryptography. More particularly, the invention relates to enforcing a policy that governs the use of cryptography within the context of an international cryptography framework.

2. Description of the Prior Art

Customers of large computer systems are typically multinational corporations that want to purchase enterprise wide computer based solutions. The distributed nature of such organizations requires them to use public international communications services to transport data throughout their organization. Naturally, they are concerned about the security of their communications and seek to use modern end-to-end cryptographic facilities to assure privacy and data integrity.

The use of cryptography in communications is governed by national policy and unfortunately, national policies differ with respect to such use. Each national policy is developed independently, generally with a more national emphasis rather than international considerations. There are standards groups that are seeking to develop a common cryptographic algorithm suitable for international cryptography. However, the issue of international cryptographic standards is not a technical problem, but rather it is a political issue that has national sovereignty at its heart. As such, it is not realistic to expect the different national cryptography policies to come into alignment by a technical standardization process.

The issue of national interests in cryptography is a particular concern of companies that manufacture open-standards-based information technology products for a worldwide market. The market expects these products to be secure. Yet, more and more consumers of these products are themselves multinational and look to the manufacturers to help them resolve the international cryptography issues inhibiting their worldwide information technology development. The persistence of unresolved differences and export restrictions in national cryptography policies has an adverse impact on international market growth for secure open computing products. Thus, it would be helpful to provide an international framework that provides global information technology products featuring common security elements, while respecting the independent development of national cryptography policies.

Nations have reasons for adopting policies that govern cryptography. Often these reasons have to do with law enforcement and national security issues. Within each country there can be debates between the government and the people as to the rightness and acceptability of these policies. Rather than engage in these debates or try to forecast their outcome, it is more practical to accept the sovereign right of each nation to establish an independent policy governing cryptography in communication.

Policies governing national cryptography not only express the will of the people and government, but also embrace certain technologies that facilitate cryptography. Technology choice is certainly one area where standardization can play a role. However, as indicated earlier this is not solely a technical problem, such that selection of common cryptographic technologies alone can not resolve the national policy differences.

A four-part technology framework that supports international cryptography, which includes a national flag card, a cryptographic unit, a host system, and a network security server is disclosed by K. Klemba, R. Merckling, *International Cryptography Framework*, in a copending U.S. patent application Ser. No. 08/401,588, which was filed on Mar. 8, 1995, now U.S. Pat. No. 5,651,068. Three of these four service elements have a fundamentally hierarchical relationship. The National Flag Card (NFC) is installed into the Cryptographic Unit (CU) which, in turn, is installed into a Host System (HS). Cryptographic functions on the Host System cannot be executed without a Cryptographic Unit, which itself requires the presence of a valid National Flag Card before it's services are available. The fourth service element, a Network Security Server (NSS), can provide a range of different security services including verification of the other three service elements.

The framework supports the design, implementation, and operational elements of any and all national policies, while unifying the design, development, and operation of independent national security policies. The framework thus gives standard form to the service elements of national security policies, where such service elements include such things as hardware form factors, communication protocols, and on-line and off-line data definitions.

FIG. 1 is a block diagram of the international cryptography framework 10, including a national flag card 12, a cryptographic unit 14, a host system 16, and a network security server 18. Three of the four service elements have a fundamentally hierarchical relationship. The National Flag Card (NFC) is installed into the Cryptographic Unit (CU) which, in turn, is installed into a Host System (HS). Cryptographic functions on the Host System cannot be executed without a Cryptographic Unit, which itself requires the presence of a valid National Flag Card before it's services are available. The fourth service element, a Network Security Server (NSS), provides a range of different security services including verification of the other three service elements, and thus acts as a trusted third party.

FIG. 2 is a perspective view showing the four basic elements of the framework, including the cryptographic unit 14 and several national flag cards 12, a host system 16, and a national security server 18. In the following sections each service element is discussed in greater detail.

National Flag Card (NFC)

In one embodiment, the NFC 12 is a small stamp sized (25×15 mm) ISO 7816-type smart card, i.e. a one chip computer 26 having a non-volatile memory. The NFC is mounted on a rigid substrate and sealed in a tamper-proof package. The NFC is typically produced independently and distributed by National agencies (e.g. United States Postal Service, German Bundespost). National agencies may also license NFC production and distribution to private industry.

The action of the NFC service element is to enforce a Nation's policy governing the use of cryptography. An NFC is a complete computer that can be constructed as a multichip architecture to include custom integrated circuits. It also would include tamper resistance and unique identification features, making unauthorized entry or duplication impossible. For example, the NFC could be sealed in such a way that opening its package would destroy any integrated circuit or data inside. The NFC could require receipt of an encrypted authorization issued by the National Security Server. All services of the NFC are provided via standard ISO 7816 message exchanged protocol between the NFC and other service elements. This format is identical to the smart card used in Europe to support GSM in cellular voice services.

Cryptographic Unit (CU)

The CU is a tamper-resistant hardware component designed to provide protected cryptographic services under the strict control of an NFC. CUs would be produced competitively by system vendors and third parties and be free of import and export restrictions. Because the CU includes critical elements of security such as encryption algorithms and keys, it is likely that it would be certified (e.g. NIST, NCSC, or ITSEC Certified) for customer assurance. It is a feature of this embodiment of the invention that the CU does not contain any governing policy other than its dependence upon a NFC. This component is preferably designed for performance and protection with customization for a given Host System.

Host System (HS)

The HS is identifiable as the hardware component that delivers secure information technology services directly to the user. HSs are typically a general purpose information technology device and would be produced competitively in a wide open market. Examples include personal digital assistants, personal computers, workstations, laptops, palmtops, networked servers, main frames, network printers, or video display units. The function of the HS service element in the framework is to provide an Application Programming Interface (API) for accessing the CU service element. Preferably, CU support is provided as an option available on the HS.

Network Security Server (NSS)

The NSS is a network node designed and designated to provide trusted third party security services. For example, any network access, such as via modems 30, 32 over a network 34, must be authenticated by the NSS. In the context of national security, NSSs are preferably developed, owned, and operated by government agencies. Some of the functions provided by the NSS service element include service element authentication, message stamp authentication, national policy enforcement, and cryptographic key distribution. The importance of the NSS can rise sharply in environments where a strong degree of verification is prerequisite to cryptographic use. The NSS also plays a significant role in the interoperability of differing National cryptographic policies.

Scope of the Framework

The scope of the framework is largely defined by the scope of the NFCs. The basic scope of the NFCs is that of a domain. A domain can be as large as worldwide and as small as a business unit. At the domain level there is no unique distinction among its members. While this framework primarily focuses on National and International domains (e.g. France, Germany, United States, United Kingdom, European Commission, NATO, North America, G7) other domains or sub-domains are also considered. For example, industry domains (e.g. Telecom, Healthcare, Financial Services, Travel), corporate domains (e.g. Hewlett-Packard, Ford Motor Company, CitiBank), association domains (e.g. IEEE, ISO, X/Open), service domains (e.g. Compuserve, America On-Line), and product domains (e.g. Lotus, Microsoft, General Motors, Proctor & Gamble).

Beyond domains and subdomains the scope of the framework can optionally be expanded to define uniqueness within a domain. Again it is the NFCs that make this narrower scope possible. Providing uniqueness means allowing for the transfer of unique or personal data to be transferred to the NFC either at the time of purchase or at the point of initial validation. NFCs are considered anonymous when dealing at the domain level. When uniqueness is added, NFCs are no longer anonymous.

Interconnect of Framework Elements

The interconnection of service elements (e.g. NFC, CU, HS, NSS) of this framework is accomplished by the adoption of standard Application Programming Interfaces (e.g. X/Open, OSF) and industry standard protocol exchanges (e.g. TCP/IP, ISO, DCE, X.509). The interconnection of elements may be synchronous (i.e. on-line), asynchronous (i.e. off-line), local (e.g. runtime library), remote (e.g. RPC) or any combination of these. For example, a policy that involves personalization of NFCs could perform a one time authorization function via a NSS making it unnecessary for future on-line verification with an NSS until the NFC expires.

Beyond the physical interconnection of the framework's service elements lies the message exchange between the elements and the actual services provided and requested via this message exchange. FIG. 3 illustrates the message exchange paths, between an NFC 12 and a CU 14 (path 35), between the CU 14 and an HS 16 (path 36), and between the HS 16 and an NSS 18 (path 37). A virtual connection 38 exists between the NFC and the NSS. Messaging protocol between the HS and the CU along the path 36 are best taken from cryptographic API standardization efforts (e.g. NSAs Cryptographic API, Microsoft's Cryptographic API). The messaging protocol between the CU and the NFC along the path 35 is categorized into two groups: initialization protocols, and operational protocols. The initialization protocols must be successful before operational protocols are active.

Critical to the implementation of the framework is the provision of a fundamental technology that allows the production of the various service elements. While various implementations of the service elements are within the skill of those versed in the relevant art, there exists a need for specific improvements to the state of the art if the full potential of the framework is to be realized.

Consequently, it would be useful to provide a common, accepted cryptography framework, wherein independent technology and policy choices can be made in a way that still enables international cryptographic communications consistent with these policies. Further, it would be useful to provide various configurations that allow flexibility in the implementation of such a cryptography framework without compromising the security and control afforded by such framework, in particular where the policy enforced within the framework was available in any one of several different configurations.

SUMMARY OF THE INVENTION

The invention provides a flexible policy element that may be variously configured for chosen applications that employ a four-part technology framework which supports international cryptography. The cryptography framework includes the policy, i.e. a national flag card, a cryptographic unit, a host system, and a network security server. Three of the four service elements have a fundamentally hierarchical relationship. The National Flag Card (NFC), also referred to herein as the "policy," is installed into the Cryptographic Unit (CU) which, in turn, is installed into a Host System (HS). Cryptographic functions on the Host System cannot be executed without a Cryptographic Unit, which itself requires the presence of a valid National Flag Card before it's services are available. The fourth service element, a Network Security Server (NSS), can provide a range of different security services including verification of the other three service elements.

The invention specifies several different configurations that support policy within a cryptographic system, such as the international cryptography framework. Such configurations provide considerable flexibility that allows the framework to be adapted to various connection schemes involving, at least, the cryptographic unit and the policy. In all embodiments of the invention, a controlling principle is that cryptography is not made available to a user of the cryptographic unit in the absence of a policy.

The invention also provides various improvements in interoperability and allows the coexistence of different configurations. In the exemplary embodiment of the invention, such configurations include dedicated applications, e.g. a policy provided in a cryptographic unit having either a built-in or local smart card reader, or a policy in a remote smart card reader; and shared applications, e.g. a policy provided in a host system local smart card reader.

BRIEF DESCRIPTION OF THE DRAWINGS

FIG. 2 is a perspective view showing the four basic elements of the framework, including a cryptographic unit and several national flag cards, a host system, and a national security server;

FIG. 3 illustrates the message exchange paths, between an NFC and a CU, between a CU and an HS, and between an HS and an NSS; and FIG. 4a is a schematic diagram that represents physical and logical connection end points of the four framework service elements in an untrusted environment;

FIG. 4b is a schematic diagram that represents physical and logical connection end points of the four framework service elements in a trusted environment;

FIGS. 5a–5f are block schematic diagrams that represent the n-ary relationships between the framework elements through connection end points that are established between a policy and a cryptographic unit; and FIGS. 6a–6f are block schematic diagrams that represent the n-ary relationships between the framework elements through connection end points that are established between a policy and an NSS;

FIG. 8 is a block schematic diagram of another dedicated policy element according to a second preferred embodiment of the invention;

DETAILED DESCRIPTION OF THE INVENTION

Figure 1:
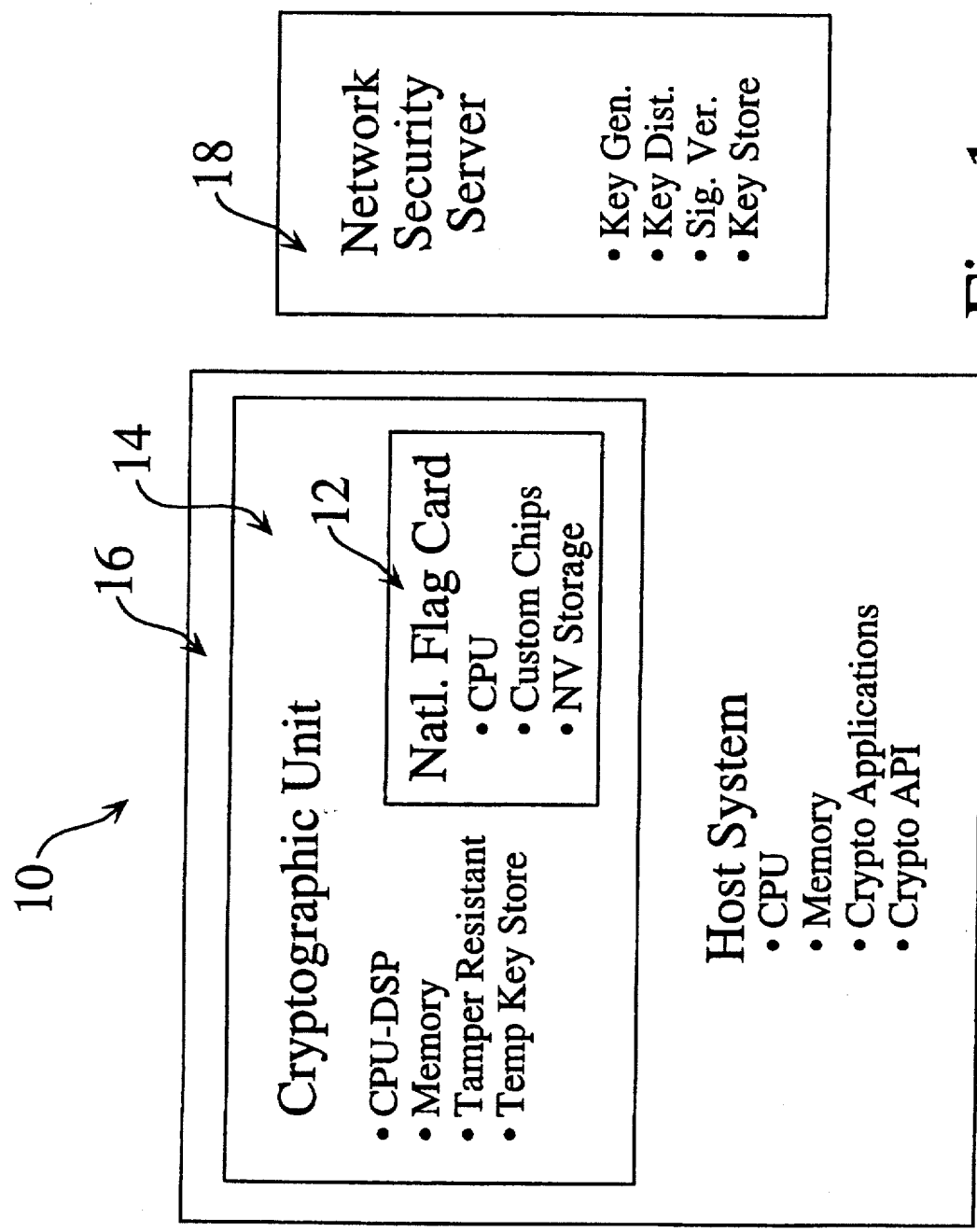
FIG. 1 is a block diagram of an international cryptography framework, including a national flag card, a cryptographic unit, a host system, and a network security server.

National cryptography policy often varies by industry segment, political climate, and/or message function. This makes it difficult to assign one uniform policy across all industries for all time, consequently, the flexibility of a cryptography framework that incorporates a national flag card is very attractive. The preferred embodiment of the invention is therefore directed to resolving problems surrounding international cryptography within a framework that may be used to support the design and development of any national policy regarding cryptography.

The invention provides a variety of policy configurations for an international cryptography framework that has four service elements, where each service element offers different types of services. The invention is discussed in connection with the cryptography framework, which is presently the preferred embodiment of the invention. It should be appreciated that the invention has application within other systems and is therefore not limited to the framework described herein, nor is it limited to applications that support cryptography, but may be used with any application that requires a dedicated, tamper-proof policy element.

Although a primary objective of a system, such as the international cryptography framework, is to maintain contact with the policy to enforce a government dictated discipline, there are a variety of ways and different configurations that could be used to accomplish such objective. All of these configurations can preserve the essence of international cryptography framework, i.e. the cryptographic function is not allowed to operate in the absence of a policy. The basic assumption in each of the different configurations described hereinbelow is that the cryptographic unit cannot provide the host system with any cryptographic functions without being in contact with the policy. For purposes of this discussion, the term "in contact with" is not limited to mean that the policy card is physically present at that location, but the essence of the invention is that there is a policy somewhere that controls the cryptographic unit, e.g. the policy could be located millimeters from the cryptographic unit or it could be located miles away from the cryptographic unit.

Thus, policy execution, storage, and control functions may be divided between the NFC and the cryptographic unit. For example, the policy can be a software based policy control function that is processed in a trusted environment, such as a trusted kernel. Further, the framework elements that are concerned with trust, e.g. the NFC, cryptographic unit, and NSS, can have either a physical or logical connection. Additionally, the cryptographic unit can be a software based cryptographic engine having an execution policy that is controlled in a trusted environment, such as a trusted kernel.

The policy itself has no access to other data, such as user data that is processed in the cryptographic unit. Thus, the policy does not admit information that could compromise it's integrity. Accordingly, the cryptographic unit, as controlled by a given policy, remains deterministic for all configurations.

Another requirement of the system is that the policy must know which cryptographic unit it is controlling, although cryptographic unit does not have to know by which policy it is controlled. Thus, the policy only controls a deterministic number, i.e. a main specific or identified, of cryptographic units. It is possible for these to be updated by an NSS.

Additionally, the either the cryptographic unit or policy can request services of the NSS, which in turn enables further distribution or delegation of the policy function to a on-line network security server instead of a physical token card. In this embodiment of the invention, the card itself is present at the network security server and can therefore activate one or more cryptographic units in near real time. For example, a new cryptographic unit is installed within a system. The new unit accesses the NSS for activation.

Because policy is installed, the system is allowed to continue the use of cryptography. In this example, one of the functions of the policy is to allow the addition of the new unit. The policy activates the unit through the NSS, which in turn sends activation to the unit. Thus, if the name of the new user or unit is in policy, then the policy allows activation of the user/unit. This aspect of the invention allows the system to be very dynamic, yet preserves physical control of the system, such that the enabled application (in this example cryptography) is lost if the policy is removed from the NSS. This embodiment of the invention preserves the physical characteristic of the policy within the framework, even though the policy is applied within a very dynamic environment. Accordingly, the policy controls the operation of each specific cryptographic unit.

The following discussion concerns the service elements end points and communication characteristics.

FIG. 4a is a schematic diagram that represents physical and logical connection end points of the four framework service elements in an untrusted environment;

FIG. 4b is a schematic diagram that represents physical and logical connection end points of the four framework service elements in a trusted environment.

In particular, FIG. 4b represents the trusted processing capability which supports both, the trusted communication channel and the information privacy protection. Generalization and Relationship Models. To be able to generalize the case of form-factors and to focus mainly on the variability of the connections and interactions between the essential elements, NFC, cryptographic unit, HS and NSS, the figures have been in the following manner. Physically connected end-points, referring to physical links, are represented by plain lines and broken lines represent logical links.

The two service elements, the cryptographic unit 14 and the policy 12 are each connected via an end-point represented by physical means which consist of three basic components: the policy support—which stores and protects securely the policy itself, the policy reader R—which extracts the policy from the support, and a communication link which maintains a viable communication between the reader and the peer receiver in the host system.

The transmitter and the receiver have a compatible communication system or they are connected to a gateway whose function is to convert heterogeneous communication standards. The later communication connection can be extended to a mashed network of various communication standards. Each end point of the communication link is compatible with, on one side, the policy reader R and on the other side, the peer receiver.

A transition from trusted physical components to trusted execution of logical components. FIGS. 5a–5f are block schematic diagrams that represent the n-ary relationships between the framework elements through connection end points that are established between a policy and a cryptographic unit. Three examples can be given to illustrate the flexibility of the architecture when dealing with diverse physical elements.

EXAMPLE 1

A 1 to 1 Case

A policy support is a contact/contactless smart card, the policy reader R is the contact/contactless reader which transmits the information over an RS232 line to a cryptographic unit, represented by an internal bus board with a chip. One instance of this case is represented by a PCI board with a plug-in chip. The communication with the NFC is made through an input/output controller for an RS232 connection located on a distant system.

EXAMPLE 2

An N to 1 Case

A policy support is a contact smart card, the policy readers Rs are the contact readers tethered to a board that allow an N to 1 relationship. An instance of a representation is the same PCI board with 8 tethered readers.

EXAMPLE 3

A Cascade Case

The policy support is a contact smart card, the policy readers Rs are the contact readers tethered to a cryptographic unit which further delegates the policy controls to the P end user cryptographic units. With the telecommunication example of a GSM infrastructure, i.e. a Global System for Mobile communication system, the AUC—Authentication Centre represents the intermediate P CUs and the GSM phones are the M end-users. The telecommunication infrastructure provides the means to the end-points connections for the NFCs and the cryptographic units.

NFC to NSS communication. Before starting the discussion between the NFC and the cryptographic unit, it is important to consider the trusted policy control system of the NSS as an application of the previous cases NFC to cryptographic unit.

Two major categories of interactions are identified between the NFC and the NSS:

The first category encompasses all attributes related to the renewal of uses for an already used algorithm, key management scheme, or constraint data. Further updates of keying material, the secret data, and the timing values are also part of that category. Installation of new policies, replacement, and obsolescence of existing policies are the last plank within that category.

The second category includes the abnormal behaviors of the cryptographic unit, detection of active attacks, or replacement of trusted components.

Both categories of relations are based on a built-in interaction policy between the NFC and the NSS. Both categories of interactions can be expressed in the relationship model as represented in FIGS. 6a–6f, which are block schematic diagrams that represent the n-ary relationships between the framework elements through connection end points that are established between a policy and an NSS.

A particular case is the cascade. The cascade represents a typical delegation structure similar to a certification hierarchy within a network of trusted third parties (TTP). An example of this structure is a mashed network of TTPs in Europe, between the UK, France, and Germany, implementing a common key recovery scheme based on national TTP representations.

Logical Components

Another potential representation of the policy support can include a trusted processor controlled software residing in a host CPU (see, for example U.S. patent application *Application Certification For An International Cryptography Framework*, Ser. No. 08/702,331, filed Aug. 23, 1996, now pending, and U.S. patent application *Method and Apparatus For Trusted Processing*, Ser. No. 08/702,332, filed Aug. 23, 1996, now pending. The communication mechanisms are the existing interprocess communication systems and the communication vehicle are the envelopes.

Trusted Versus Untrusted Processing Environment. By construction, the implicit interaction policy is built in the trusted service elements. Therefore, any service element, the cryptographic unit, the NFC, the Host, or the NSS, relies on a trusted execution capability to set up the communication channel. Moreover, the originator must also trust the recipient to uphold the secret information—touchpoint data— once the information is delivered to the recipient.

Figure 7A:
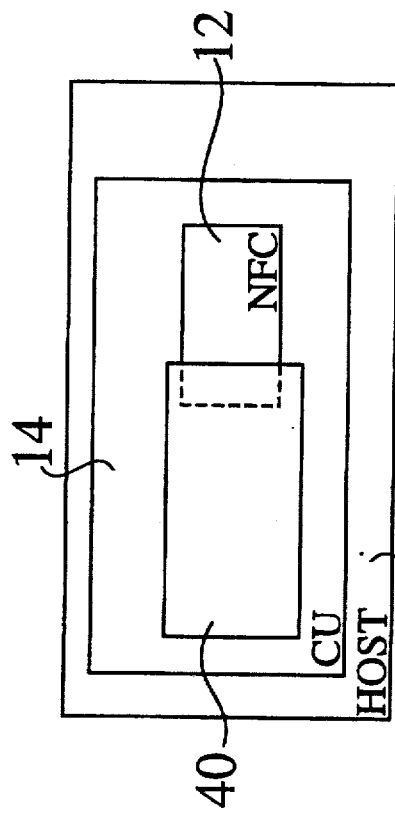
FIGS. 7a–7c provide a block schematic diagram of a dedicated policy element according to three alternative arrangements of a first preferred embodiment of the invention.
Figure 7B:
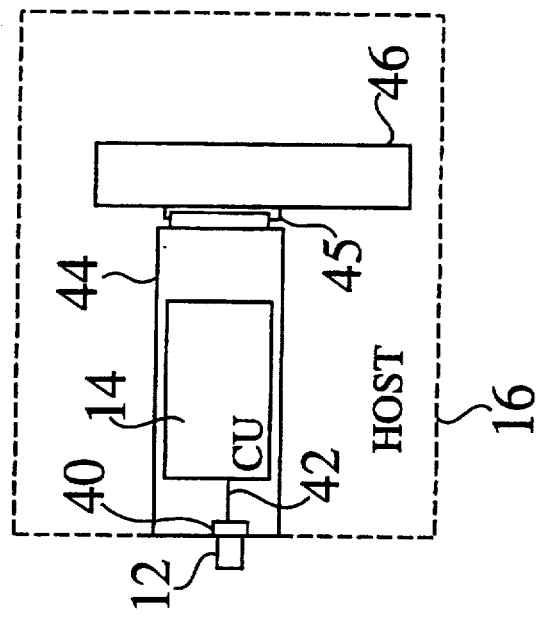
Figure 7C:
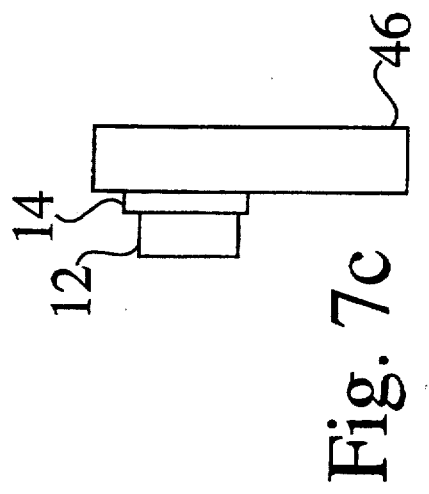

FIGS. 7a–7c provide a block schematic diagram of a dedicated policy element according to three alternative arrangements of a first preferred embodiment of the invention.

In FIG. 7a, the policy 12 is connected to the cryptographic unit 14 by a built-in smart card reader 40, where the smart card reader is solely dedicated to the function of connecting the policy to the cryptographic unit. The cryptographic unit is then connected to the host system 16. For example where the cryptographic unit is a circuit card, the circuit card is plugged into a slot on the host system motherboard (see FIG. 7b). The scanner itself may be any well known scanning device that is able to read a smart card.

In the example of FIG. 7b, where the cryptographic unit 14 is mounted on a circuit card 44, the cryptographic unit comprises a tamper resistant pad and container mounted on the circuit card, thus providing additional tamper resistance. The circuit card is connected to the host system motherboard 46 a slot 45. Traces 42 on the circuit card lead to a drawer at the back of the host system 16, i.e. the computer, that serves to receive the policy 12 within a hard wired receptacle or other port, such as the smart card reader 40.

In the example of FIG. 7c, the cryptographic unit 14 is mounted directly on the motherboard 46 and the policy 12 is connected to the cryptographic unit, for example via a receptacle in the cryptographic unit or in the motherboard itself.

In all three examples above, a smart card reader may be used to connect the policy to the cryptographic unit, where the smart card reader is both dedicated to reading only the policy, and where it is built into, or intimately associated with, the cryptographic unit.

FIG. 8 is a block schematic diagram of another dedicated policy element according to a second preferred embodiment of the invention. In this embodiment of the invention, the cryptographic unit 14 is mounted on a circuit card 44, and the circuit card is connected to the host system motherboard 46 via a motherboard slot 45. The cryptographic unit is connected to a connector 52 on the circuit card by various leads or traces 42. In one embodiment of the invention, the connector provides a standard RS-232 port, such that the circuit card includes a serial port.

A separate, dedicated smart card reader 40 has a connector 54 that allows a cable 50 to connect the smart card reader to the circuit card at the circuit card connector 52. The policy 12 is read by the smart card reader 40. Thus, in this embodiment of the invention, the smart card reader is dedicated and local to the host, but is located away from the cryptographic unit, i.e. it is not built into the cryptographic unit.

Figure 9:
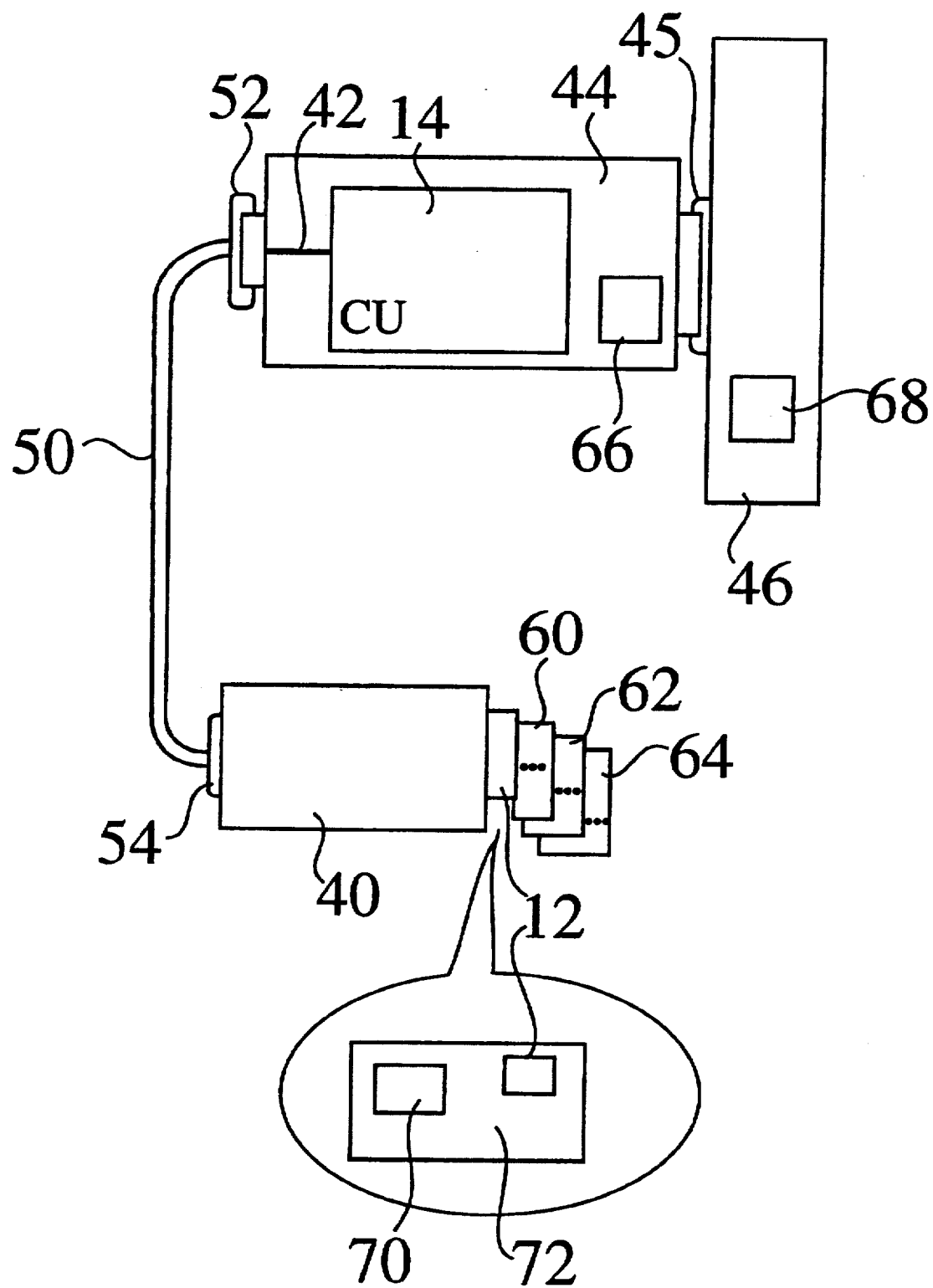
FIG. 9 is a block schematic diagram of a shared policy element according to a third preferred embodiment of the invention.

FIG. 9 is a block schematic diagram of a shared policy element according to a third preferred embodiment of the invention. In this embodiment of the invention, the cryptographic unit 14 is mounted on a circuit card 44, and the circuit card is connected to the host system motherboard 46 via a motherboard slot 45. The cryptographic unit is connected to a connector 52 on the circuit card by various leads or traces 42. In one embodiment of the invention, the connector provides a standard RS-232 port, such that the circuit card has a serial port.

A separate, shared smart card reader 40 has a connector 54 that allows a cable 50 to connect the smart card reader to the circuit card at the circuit card connector 52. The policy 12 is read by the smart card reader 40, as with the embodiment of the invention shown in FIG. 8 above.

However, it is both expensive and inefficient to provide a smart card reader whose only function is to hold the policy. In this embodiment of the invention, the smart card reader can be used to read other smart cards 60, 62, 64 to use other functions 66, 68 that may or may not be provided on the circuit card 44 or motherboard 46. This configuration is referred to as shared because the smart card reader is shared with a policy and, for example an ID card, whereas in the previously discussed embodiments of the invention the smart card reader was dedicated to performing only a policy reading function.

In one form of this embodiment, the functionality of the policy 12 is put into a smart card 72 along with an ID card function 70, such that in one smart card there is functionality for both an ID and a policy. This embodiment of the invention is useful for such applications as a passport or visa that would include both citizenship credentials and authorization for the use of cryptography. Thus, the smart card not only informs an agency or system of the user's identity, but also activates cryptography in accordance with government policy.

In use, this shared configuration activates the cryptographic function and includes with it some other functions, such as ID, that may also include ceratin privileges. The shared configuration lets the system know the user's identity and thereby enables such privileges, enforces security, and creates an audit trail of use of the system, in addition to activating the cryptographic function.

There is, in the security industry, a difference between rights and capabilities. This embodiment of the invention provides a smart card that provides a user with both rights to use cryptography and activates the cryptography with certain capabilities. Thus, a shared smart card configuration provides both right and capability on an individual basis.

Because the smart card reader is shared, separate smart cards may be used for different individuals and different functions. For example, a policy may be read by the smart card reader, where the policy may be one of multiple functions on a smart card, such that the bearer of the card receives rights to use cryptography, as well as other rights/ privileges. Other users of the system may have a smart card that does not have a policy. For such individuals, cryptography does not exist in the system, although these individuals may have certain other rights and/or capabilities. In both cases, an ID function associated with the smart card may be provided that serves to control access to the system, while maintaining an audit trail of system use.

Thus, in this embodiment of the invention, the smart card reader is used for multiple purposes, i.e. it is shared between the policy and other functions, and is local to the host, but is located away from the cryptographic unit, i.e. it is not built into the cryptographic unit.

Figure 10:
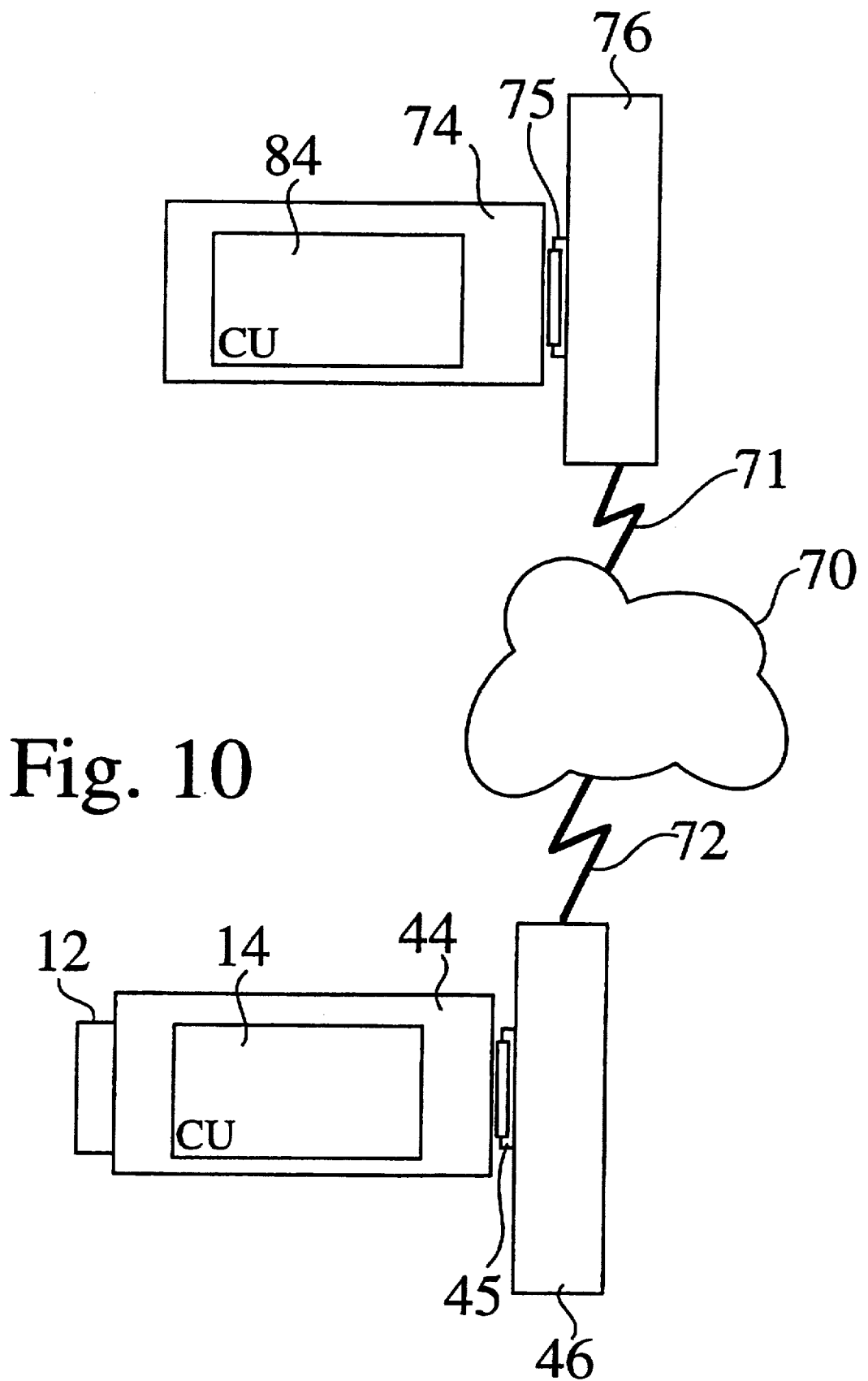
FIG. 10 is a block schematic diagram of yet another dedicated policy element according to a fourth preferred embodiment of the invention.

FIG. 10 is a block schematic diagram of yet another dedicated policy element according to a fourth preferred embodiment of the invention. In this embodiment of the invention, the host is connected via a network 70, 71, 72 to another host that has any one of the above described combinations of cryptographic unit 14 and policy 12. The remote cryptographic unit 84 is activated from the policy 12 across the network. The remote cryptographic unit may be otherwise configured as above, e.g. mounted on a circuit card 74 that is connected to a motherboard 76 via a card slot 75 on the motherboard.

In one form of this embodiment of the invention, the policy controls a small number of cryptographic units through the network. The number of cryptographic units that the policy is managing via the network is limited by the capability of the policy's bandwidth in processing power. To address this limitation of the policy, another form of this embodiment of the invention provides an enabling functionality at a first cryptographic unit 14 that is transferred from the policy to the cryptographic unit 14. The cryptographic unit, in turn, enables all other cryptographic units in the system. If the policy is removed, the prime cryptographic unit loses its function and, with it, all of the other cryptographic units lose their function. Thus, a more powerful cryptographic unit is empowered to activate other cryptographic units, all in accordance with and under the control of a policy, where the policy instructs the prime cryptographic unit with regard to which other units may be enabled, who may use these units, and what rights/capabilities attach to such users.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A cryptographic apparatus for an international cryptography framework, said cryptographic apparatus providing a uniform cryptographic function that operates in a manner consistent with diverse national, regional, industry, or agency cryptographic policies, said cryptographic apparatus comprising:

a policy element for enabling execution of any cryptographic scheme required by a particular national, regional, industry, or agency cryptographic policy of the domain in which said international cryptography framework is used;

a cryptographic unit including a cryptographic engine, said cryptographic unit executing said cryptographic scheme, wherein said policy element is in communication with said cryptographic unit, and wherein cryptographic functions cannot be executed by said cryptographic unit in the absence of said policy element; and at least one reader for placing said policy element in communication with said cryptographic unit.

2. The apparatus of claim 1, wherein said reader is dedicated to reading only the policy element.

3. The apparatus of claim 1, wherein said reader is a shared reader that both activates said cryptographic unit and that performs at least one other function.

4. The apparatus of claim 1, wherein said reader is built into said cryptographic unit.

5. The apparatus of claim 1, wherein said reader is located proximate to said cryptographic unit.

6. The apparatus of claim 1, wherein said reader is remote from said cryptographic unit, said cryptographic unit being activated by said policy element across a network.

7. The apparatus of claim 1, wherein said policy element is a tamper-resistant smart card to which unauthorized entry, or duplication thereof, is substantially prevented.

8. The apparatus of claim 1, wherein said policy element implements at least one additional cryptography engine in combination with said cryptographic unit.

9. A cryptographic apparatus for an international cryptography framework, said cryptographic apparatus comprising:

a policy element for enabling execution of any cryptographic scheme required by a particular application, wherein said cryptographic scheme implements a cryptographic standard;

a cryptographic unit including a cryptographic engine, said cryptographic unit implementing said cryptographic scheme if and only if said cryptographic unit is used in combination with a valid policy element; and a host system for executing an information technology application, said host system being in communication with said cryptographic unit and implementing said cryptographic scheme if and only if said host system is used with combination with a cryptographic unit and a valid policy element; and a reader for placing said policy element in communication with said cryptographic unit.

10. The apparatus of claim 9, wherein said reader is dedicated to reading only the policy element.

11. The apparatus of claim 9, wherein said reader is a shared reader that both activates said cryptographic unit and that performs at least one other function.

12. The apparatus of claim 9, wherein said reader is built into said cryptographic unit.

13. The apparatus of claim 9, wherein said reader is located proximate to said cryptographic unit.

14. The apparatus of claim 9, wherein said reader is remote from said cryptographic unit, said cryptographic unit being activated by said policy element across a network.

15. The apparatus of claim 9, wherein said policy element is a tamper-resistant smart card to which unauthorized entry, or duplication thereof, is substantially prevented.

16. The apparatus claim 9, wherein said policy element implements at least one additional cryptography engine in combination with said cryptographic unit.

17. The apparatus of claim 9, wherein said cryptographic scheme may comprise any of a cryptographic algorithm, a specified level of cryptography, a national policy, information personalization, and system and network access metering.

18. In a cryptographic apparatus for an international cryptography framework a method for providing a uniform cryptographic function that operates in a manner consistent with diverse national, regional, industry, or agency cryptography policies, said method comprising the steps of:

providing a policy element for enabling operation of a cryptographic scheme required by a particular national, regional, industry, or agency cryptographic policy of the domain in which the cryptographic function is used;

using a reader to place said policy element in communication with a cryptographic unit;

operating said policy element in combination with said cryptographic unit, said cryptographic unit including a cryptographic engine, said cryptographic unit executing said encryption scheme; and executing an information technology application with said host system, said host system being in communication with said cryptographic unit via an application programming interface.

19. The method of claim 18, wherein said reader is dedicated to reading only the policy element.

20. The method of claim 18, wherein said reader is a shared reader that both activates said cryptographic unit and that performs at least one other function.

21. The method of claim 18, wherein said reader is built into said cryptographic unit.

22. The method of claim 18, wherein said reader is located proximate to said cryptographic unit.

23. The method of claim 18, wherein said reader is remote from said cryptographic unit, said cryptographic unit being activated by said policy element across a network.

24. The method of claim 18, wherein said policy element is a tamper-resistant smart card to which unauthorized entry or duplication thereof, is substantially prevented.

25. In a cryptographic apparatus for an international cryptography framework, a policy mechanism for controlling operation of a cryptographic unit, said policy element comprising:

a policy element; and at least one reader for connecting said policy element to said cryptographic unit, wherein said policy mechanism is placed in communication with said cryptographic unit, and wherein cryptographic functions cannot be executed by said cryptographic unit in the absence of said policy element.

26. The policy mechanism of claim 25, wherein said reader is dedicated to reading only the policy element.

27. The policy mechanism of claim 25, wherein said reader is a shared reader that both activates said cryptographic unit and that performs at least one other function.

28. The policy mechanism of claim 25, wherein said reader is built into said cryptographic unit.

29. The policy mechanism of claim 25, wherein said reader is located proximate to said cryptographic unit.

30. The policy mechanism of claim 25, wherein said reader is remote from said cryptographic unit, said cryptographic unit being activated by said policy element across a network.

31. The policy mechanism of claim 25, wherein said policy element is a tamper-resistant smart card to which unauthorized entry or duplication thereof, is substantially impossible.

32. The policy mechanism of claim 25, wherein said policy element implements at least one cryptographic engine in combination with said cryptographic unit.

33. The policy mechanism of claim 25, wherein said policy element includes a cryptographic function and at least one other function.

34. The policy mechanism of claim 33, said at least one other function including any of establishing identity, establishing privileges, establishing rights, enabling capabilities, and creating an audit trail.

35. The policy mechanism of claim 25, wherein said policy element controls the operation of more than one cryptographic unit.

36. The policy mechanism of claim 25, wherein said policy element controls the operation of a prime cryptographic unit which, in turn, activates and controls the operation or one or more other cryptographic units.

* * * * *